United States Patent
Nasu et al.

(10) Patent No.: US 11,493,776 B2
(45) Date of Patent: Nov. 8, 2022

(54) POLARIZATION MULTIPLEXED OPTICAL TRANSMITTER CIRCUIT AND POLARIZATION MULTI/DEMULTIPLEXED OPTICAL TRANSCEIVER CIRCUIT

(71) Applicant: Nippon Telegraph and Telephone Corporation, Tokyo (JP)

(72) Inventors: Yusuke Nasu, Musashino (JP); Manabu Oguma, Musashino (JP); Shogo Yamanaka, Musashino (JP); Makoto Jizodo, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/311,955

(22) PCT Filed: Dec. 24, 2019

(86) PCT No.: PCT/JP2019/050706
§ 371 (c)(1),
(2) Date: Jun. 8, 2021

(87) PCT Pub. No.: WO2020/138118
PCT Pub. Date: Jul. 2, 2020

(65) Prior Publication Data
US 2022/0066227 A1    Mar. 3, 2022

(30) Foreign Application Priority Data
Dec. 28, 2018    (JP) .............................. JP2018-246956

(51) Int. Cl.
*H04J 14/06* (2006.01)
*G02B 27/28* (2006.01)
(Continued)

(52) U.S. Cl.
CPC ......... *G02B 27/283* (2013.01); *G02B 27/281* (2013.01); *G02F 1/2955* (2013.01); *H04B 10/40* (2013.01); *H04J 14/06* (2013.01)

(58) Field of Classification Search
CPC .... G02B 27/283; G02B 27/281; G02B 6/125; G02F 1/2955; G02F 1/225; H04B 10/40;
(Continued)

(56) References Cited

U.S. PATENT DOCUMENTS

2004/0208646 A1 * 10/2004 Choudhary ........ H04B 10/5053
398/188
2018/0139007 A1 * 5/2018 Kamei .................... H04J 14/06
(Continued)

FOREIGN PATENT DOCUMENTS

JP    62-63312 B2    12/2017

OTHER PUBLICATIONS

Bo Zhang et al., *Practical Limits of Coherent Receivers for Unamplified 100Gb/s Applications*, OFC/NFOEC Technical Digest, OW1E. 3, Mar. 17, 2013, pp. 1-3.

*Primary Examiner* — Hibret A Woldekidan
(74) *Attorney, Agent, or Firm* — Workman Nydegger

(57) ABSTRACT

A polarization multiplex optical transmitter circuit can provide compensation for the transmission PDL while reducing decrease in transmission power. The polarization multiplex optical transmitter circuit includes a beam divider circuit configured to divide light outputted from a light source, optical phase shifters provided in at least one of two waveguides connected to output terminals of the beam divider circuit, a light wave synthesizer circuit connected to the two waveguides, first and second optical transmitters coupled to two output terminals of the light wave synthesizer circuit, a polarization multiplexer configured to synthesize two output polarized waves from the first and second optical transmit-
(Continued)

ters, and a polarization rotator provided between the first and second optical transmitters and the polarization multiplexer and coupled to at least one of the first and second optical transmitters.

7 Claims, 9 Drawing Sheets

(51) Int. Cl.
*G02F 1/295* (2006.01)
*H04B 10/40* (2013.01)

(58) Field of Classification Search
CPC .. H04B 10/1123; H04B 10/50; H04B 10/505; H04B 10/5051; H04B 10/5053; H04B 10/532; H04B 10/548; H04B 10/43; H04B 10/6166; H04B 10/503; H04J 14/06; H04J 14/002
USPC .................................. 398/65, 152, 184, 188
See application file for complete search history.

(56) References Cited

U.S. PATENT DOCUMENTS

| | | | |
|---|---|---|---|
| 2019/0049743 A1* | 2/2019 | Akiyama | ................ H01S 5/005 |
| 2022/0045764 A1* | 2/2022 | Nasu | ....................... H04J 14/06 |

* cited by examiner

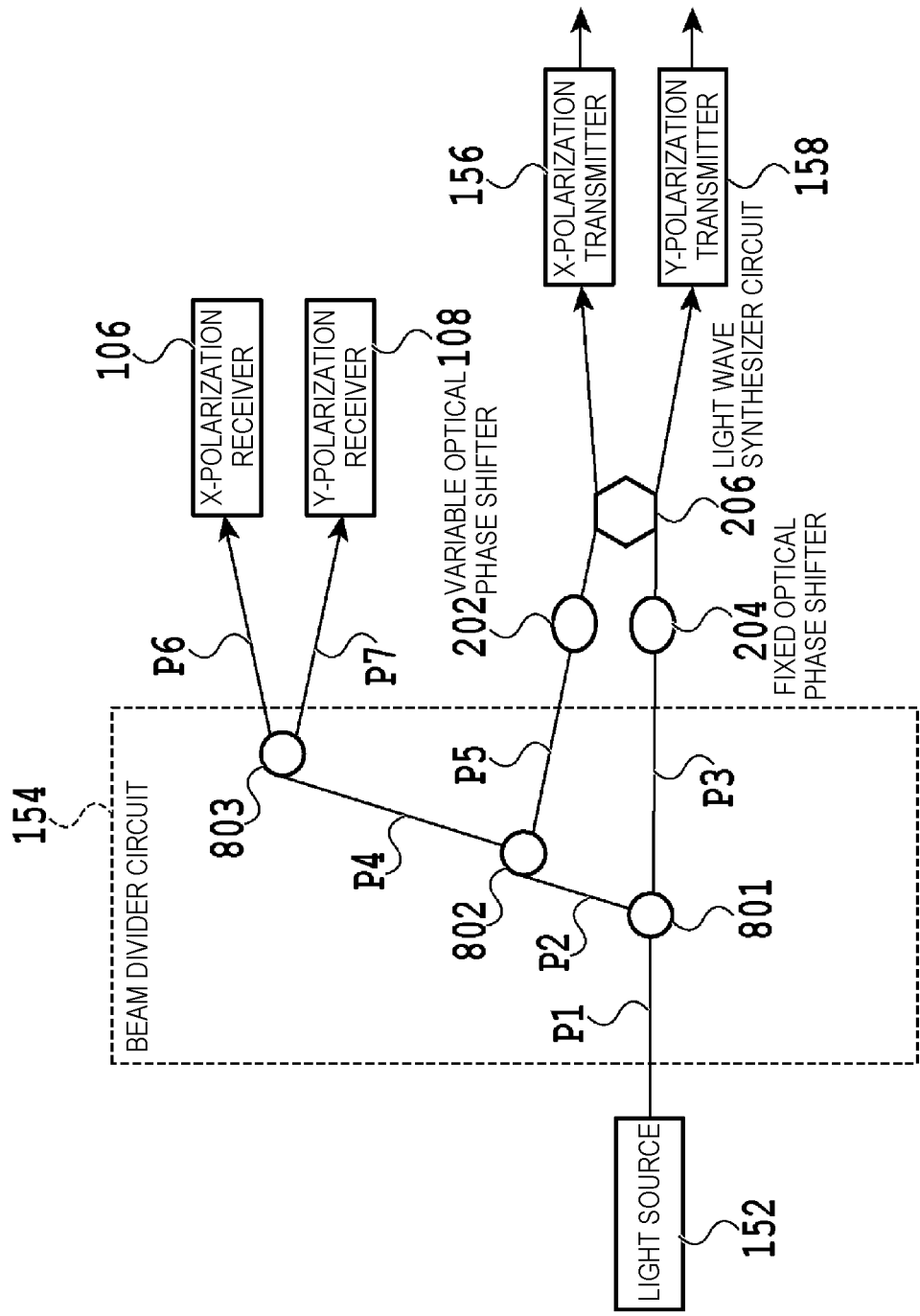

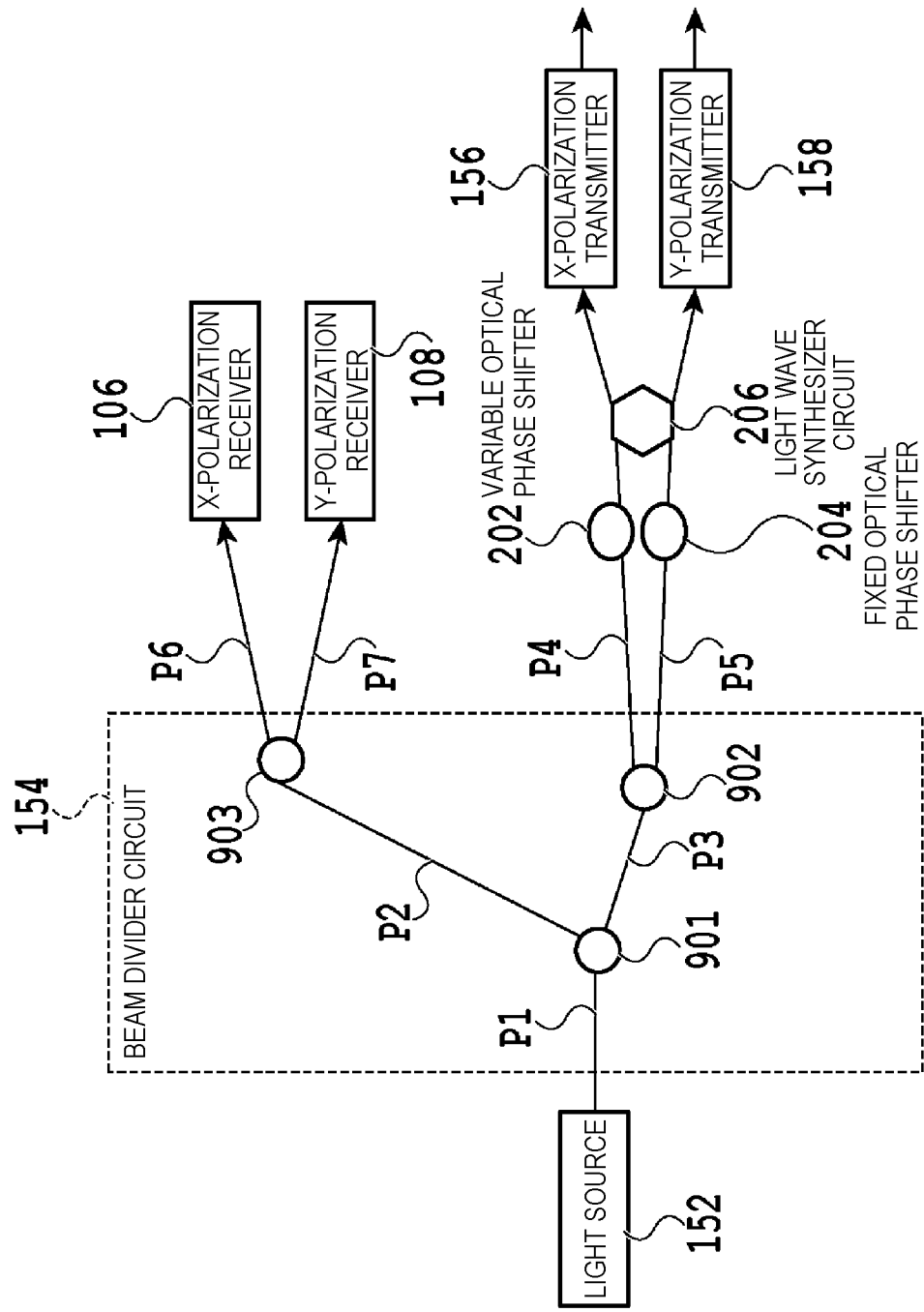

POLARIZATION MULTIPLEXED OPTICAL TRANSMITTER CIRCUIT AND POLARIZATION MULTI/DEMULTIPLEXED OPTICAL TRANSCEIVER CIRCUIT

TECHNICAL FIELD

The present invention relates to polarization multiplex optical transmitter circuits and polarization multiplex optical transceiver circuits. In particular, the present invention relates to a polarization multiplex optical transmitter circuit and a polarization multiplex optical transceiver circuit for integrated coherent polarization multiplex systems.

BACKGROUND ART

Especially for long-distance optical communications, optical transmission systems employing the digital coherent technology, in which the channel capacity for communication can be dramatically increased, have been developed in recent years and they are now commercially spreading. Optical communications based on the digital coherent technology usually use polarization multiplex systems for doubling the transmission capacity by transmitting separate signals on two orthogonal polarized waves (polarized light beams).

Various signal formats are used to modulate signals onto polarized waves; however, quadrature phase shift keying (QPSK) is mostly used for systems having 100 Gbit/s channel capacity, which are currently most often introduced for commercial use. In the future, the digital coherent technology will be a main technology for further increasing the capacity of systems having 100 Gbit/s channel capacity or more.

FIG. 1 illustrates an overall configuration of a transceiver of a digital coherent polarization multiplex system including an optical transmitter circuit and a receiver circuit. FIG. 1 will be described in detail below.

The receiver circuit includes a polarization splitter 102, an X-polarization receiver 106 coupled to an output terminal of the polarization splitter, a polarization rotator 104 coupled to another output terminal of the polarization splitter, and a Y-polarization receiver 108 coupled to the polarization rotator.

The transmitter circuit includes a light source 152, a beam divider circuit 154 coupled to the light source, an X-polarization transmitter 156 coupled to an output terminal of the beam divider circuit, a Y-polarization transmitter 158 coupled to another output terminal of the beam divider circuit, an optical attenuator 160 coupled to an output terminal of the X-polarization transmitter, an optical attenuator 162 coupled to an output terminal of the Y-polarization transmitter, a polarization rotator 164 coupled to an output terminal of the optical attenuator 162, and a polarization multiplexer 166 coupled to an output terminal of the optical attenuator 160 and an output terminal of the polarization rotator 164.

In the configuration of the receiver circuit, the polarization splitter 102 splits a received optical signal into an X-polarized wave and a Y-polarized wave. The polarized waves are inputted separately to the X-polarization receiver 106 and the Y-polarization receiver 108.

The X-polarization receiver 106 and the Y-polarization receiver 108 are both optical coherent mixers composed of a mixer, a photodetector, and the like. The optical coherent mixer is used to convert an optical signal into an electrical signal. To obtain phase information of received light, light emitted by the light source 152 installed in the transceiver is divided by the beam divider circuit 154 and inputted together with a received optical signal to both the X-polarization receiver 106 and the Y-polarization receiver 108, and as a result, the information can be obtained from the signal light by causing the light and the received optical signal to interfere with each other.

On the other hand, in the configuration of the transmitter circuit, the light source 152 in the transceiver is also used to generate a transmit optical signal. Portions of the light emitted by the light source 152 and divided by the beam divider circuit 154 are inputted to the X-polarization transmitter 156 and the Y-polarization transmitter 158.

The X-polarization transmitter 156 and the Y-polarization transmitter 158 each convert a transmit electrical signal into an optical signal. The Y-polarization transmitter 158 outputs the transmit optical signal and the polarization rotator 164 of a later stage converts the transmit optical signal into a polarized wave orthogonal to a polarized wave outputted from the X-polarization transmitter.

The polarization multiplexer 166 multiplexes the two mutually orthogonal transmit optical signals outputted separately from the X-polarization transmitter 156 and the Y-polarization transmitter 158. As a result, separate pieces of information of the orthogonal polarized waves are combined into a transmit optical signal.

There is a demand for downsizing such an optical transmitter circuit and an optical receiver circuit for digital coherent polarization multiplex systems; and it has been considered to integrate the optical transmitter circuit and the optical receiver circuit into one chip by using a photonic integrated circuit (PIC) employing indium phosphorus (InP) or silicon optical waveguides. However, the light source 152 may be provided outside the chip due to differences in material and manufacturing methods.

The light source 152 in the transceiver can be provided for each of the transmitter and the receiver; however, since in recent years there are demands for downsizing the transceiver and reducing power consumption, the configuration as in FIG. 1 in which a single light source is shared for transmission and reception is used in an increasing number of cases. The beam divider circuit 154 illustrated in FIG. 1 is provided to share the light source 152 and needs to be configured to efficiently use limited light source power and maximize the performance of the transceiver.

For example, when the power of the light source 152 is limited or no amplifier is provided on the transmission line, in comparison to the case in which the beam divider circuit 154 equally divides continuous light from the light source 152 into the transmitter circuit side and the receiver circuit side, it is possible to achieve a better transmission and reception characteristic in many cases when the transmit side is allocated more power. Non-Patent Literature 1 specifically describes the optimization of this division ratio; according to the description, the suitable inequality is, although depending on conditions, approximately up to the following ratio:transmit side:receive side=70:30; this means that, with this ratio, the distance that optical signals are transmitted can be maximized. By contrast, when there is no limitation about the power of the light source 152 or the transmission line, the suitable ratio is approximately the following: transmit side:receive side=50:50.

Additionally, the intensities of light transmitted separately to the X-polarization transmitter 156 and the Y-polarization transmitter 158 on the transmitter circuit side are determined in accordance with an unequal division ratio. While signal lights outputted by the X-polarization transmitter 156 and the Y-polarization transmitter 158 are subjected to polarization multiplexing and outputted, the loss varies between the polarized waves. For example, the polarization rotator 164 exists on only one transmit path side (the transmit path of the Y-polarization transmitter 158 side in the example in FIG. 1) of the X-polarization transmitter 156 and the Y-polarization transmitter 158, in which approximately 1 or 2 dB circuit excess loss occurs. In addition to this, various kinds of loss also occur, and as a result, the loss differs between the X-polarized wave and the Y-polarized wave of transmit signal. Thus, it is necessary to eliminate the difference in loss between the X-polarized wave and the Y-polarized wave by previously dividing light from the light source 152 into the X-polarization side and the Y-polarization side in accordance with an unequal division ratio with the use of the beam divider circuit 154. Hereinafter, the difference in loss between the X-polarization circuit side path and the Y-polarization circuit side path in the transmitter circuit is referred to as a transmission polarization dependent loss (transmission PDL).

The design of the beam divider circuit 154 is important for reducing power consumption of the transceiver and downsizing the transceiver, and for efficiently using light from the light source 152. Methods for implementing a circuit with an efficient division ratio have been developed as described in, for example, Patent Literature 1. One method achieves required unequal division while minimizing the excess loss by causing the beam divider circuit 154 to divide light into the transmitter circuit side and the receiver circuit side in accordance with an unequal division ratio and also to unequally divide light into the X-polarization transmitter 156 and the Y-polarization transmitter 158 to reduce the difference in transmitting light power between polarized waves.

However, in actual optical circuits, the transmission PDL varies due to manufacturing variations of circuits caused in the manufacturing process. Thus, although light is unequally divided into the X-polarized wave and the Y-polarized wave, the difference in transmitting light power between polarized waves may still exist. For example, when a 1 dB loss of the polarization rotator 164 is assumed but the circuit is actually manufactured with a 2 dB loss, the transmission PDL changes by 1 dB. This causes a 1 dB difference in transmitting light power between the X-polarized wave and the Y-polarized wave. When there is a difference in transmitting light power between polarized waves, the difference needs to be eliminated to achieve a balance because the difference affects the transmission quality. Known technologies thus need the following operation: the optical attenuator 160 or the optical attenuator 162 provided in subsequent stages after the X-polarization transmitter 156 and the Y-polarization transmitter 158 provides a 1 dB loss for the light with higher power on one polarized wave side, so that the difference in output transmitting light power between polarized waves is reduced to 0 dB. Since the optical attenuator 160 or the optical attenuator 162 provides a loss, output light power of the X-polarization transmitter 156 or the Y-polarization transmitter 158 decreases. As compensation for the decrease in output light power, the power of light from the light source 152 needs to be increased, and additionally, this results in increase of power consumption of the transceiver and insufficiency of transmission power.

CITATION LIST

Patent Literature

Patent Literature 1: Japanese Patent No. 6263312

Non-Patent Literature

Non-Patent Literature 1: Bo Zhang et al., "Practical Limits of Coherent Receivers for Unamplified 100 Gb/s Applications", Proceeding of OFC2013, OW1E.3, (2013)

SUMMARY OF THE INVENTION

Technical Problem

The configuration of known transceivers has a problem in which transmission power is decreased because the optical attenuator 160, 162, or the like needs to provide a loss for one of the polarized waves to eliminate the difference in power for the purpose of providing compensation for the transmission PDL that is the cause of the difference in transmitting light power between polarized waves.

The present invention has been made in view of this problem, and an object thereof is to provide compensation for the transmission PDL while reducing decrease in transmission power.

Means for Solving the Problem

To achieve this object, a first aspect of the present invention is a polarization multiplex optical transmitter circuit. The polarization multiplex optical transmitter circuit according to an embodiment includes a beam divider circuit configured to divide light outputted from a light source, a variable optical phase shifter provided in at least one of two waveguides connected to output terminals of the beam divider circuit, a light wave synthesizer circuit connected to the two waveguides, first and second optical transmitters coupled to two output terminals of the light wave synthesizer circuit, a polarization multiplexer configured to synthesize two output polarized waves from the first and second optical transmitters, and a polarization rotator provided between the first and second optical transmitters and the polarization multiplexer and coupled to at least one of the first and second optical transmitters.

A second aspect of the present invention is a polarization multiplex optical transceiver circuit. The polarization multiplex optical transceiver circuit according to an embodiment further includes a polarization multiplex optical receiver circuit including first and second optical coherent mixers coupled to the beam divider circuit of the polarization multiplex optical transmitter circuit.

Effects of the Invention

As described above, the present invention provides the polarization multiplex optical transmitter circuit and the polarization multiplex optical transceiver circuit that can provide compensation for the transmission PDL while reducing decrease in transmission power.

BRIEF DESCRIPTION OF DRAWINGS

FIG. 8 is a circuit diagram illustrating a configuration of a polarization multiplex optical transceiver circuit according to a second embodiment of the present invention.

FIG. 9 is a circuit diagram illustrating a configuration of a polarization multiplex optical transceiver circuit according to a third embodiment of the present invention.

DESCRIPTION OF EMBODIMENTS

Figure 1:
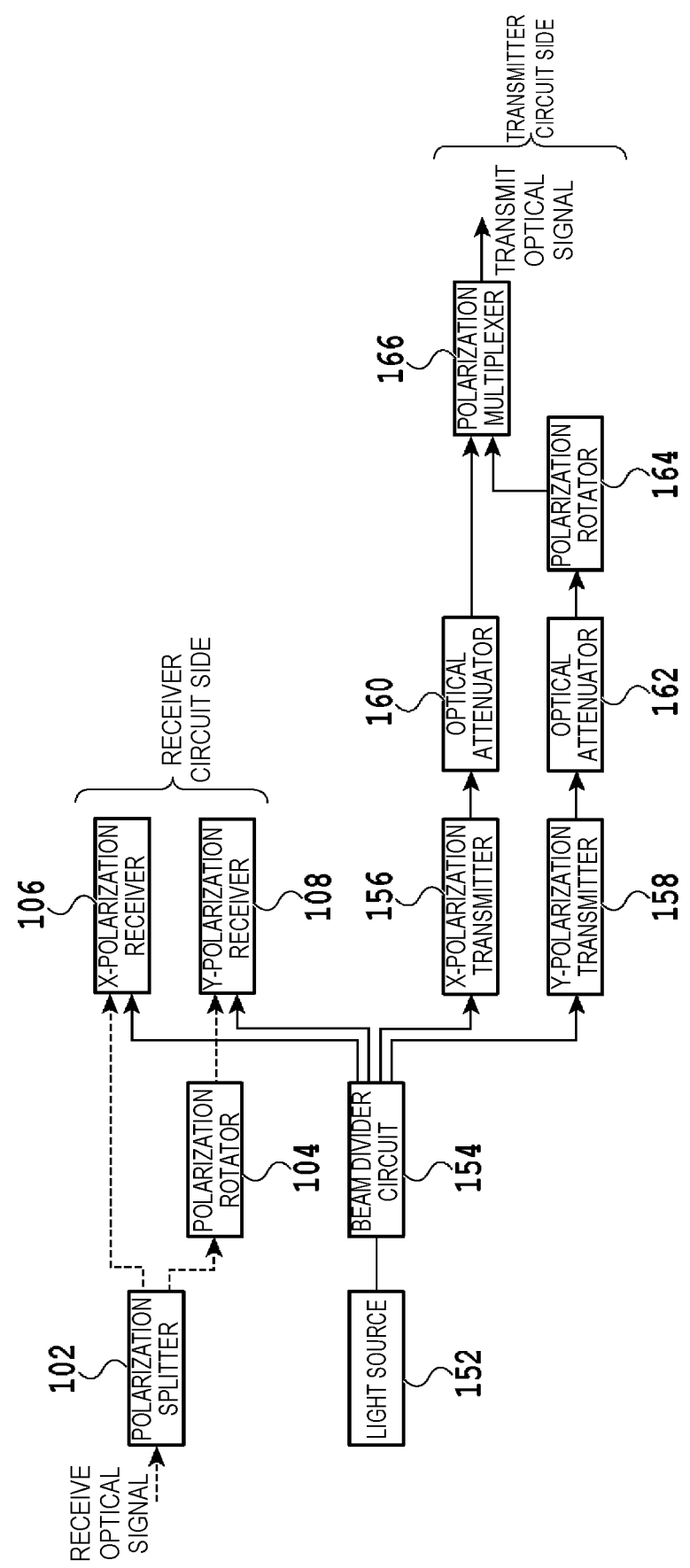
FIG. 1 is a diagram illustrating a configuration of an optical transmitter circuit and a receiver circuit in a transceiver of a digital coherent polarization multiplex system.

Hereinafter, embodiments of the present invention will be described in detail with reference to the drawings. Identical or similar reference characters indicate identical or similar elements, and redundant descriptions thereof are not repeated.

First Embodiment

Figure 2:
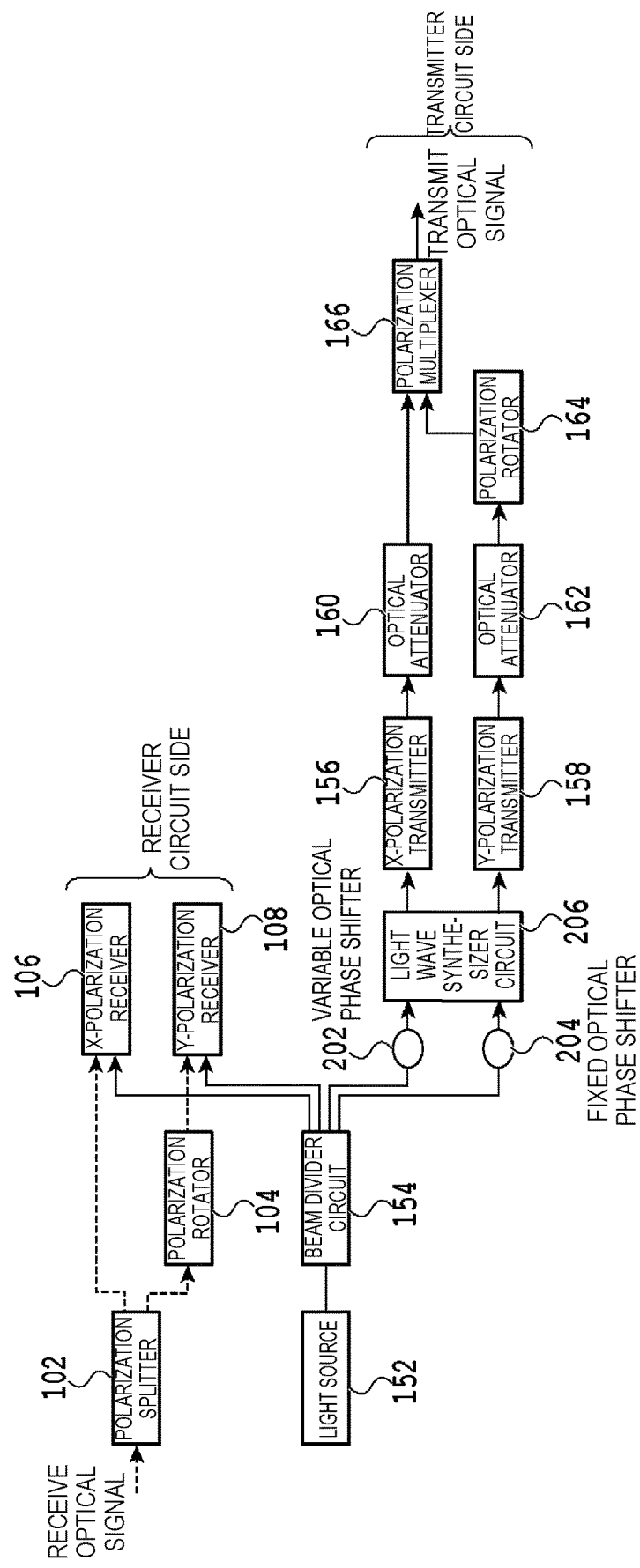
FIG. 2 is a circuit diagram illustrating a configuration of a polarization multiplex optical transceiver circuit according to a first embodiment of the present invention.

A polarization multiplex optical transceiver circuit according to a first embodiment of the present invention will be described. FIG. 2 is a circuit diagram illustrating a configuration of the polarization multiplex optical transceiver circuit according to the first embodiment of the present invention.

The beam divider circuit 154 divides light from the light source 152 into the X-polarization receiver 106 and the Y-polarization receiver 108 of the receiver circuit in accordance with a given division ratio and also divides light into the X-polarization transmitter 156 and the Y-polarization transmitter 158 on the transmitter circuit side.

The X-polarization transmitter 156 and the Y-polarization transmitter 158 are each constituted by, for example, an IQ modulator composed of a Mach-Zehnder interferometer and the like. The X-polarization transmitter 156 and the Y-polarization transmitter 158 convey information by modulating the phase and intensity of transmitting light. Signals are modulated and converted into mutually orthogonal X-polarization and Y-polarized waves by the X-polarization transmitter 156 and the Y-polarization transmitter 158, and consequently, the X-polarization and Y-polarized waves are synthesized together and transmitted as a dual-polarization multilevel-phase-shift-keying signal.

Lights obtained by the beam divider circuit 154 dividing light into the X-polarization receiver 106 and the Y-polarization receiver 108 are inputted as local lights of the receiver section (receiver circuit side) to the X-polarization receiver 106 and the Y-polarization receiver 108. The X-polarization receiver 106 and the Y-polarization receiver 108 are each composed of a quadrature hybrid circuit and light receive elements. The X-polarization receiver 106 and the Y-polarization receiver 108 cause received signal light and local light to interfere with each other, input coherent light to the light receive elements, and convert, in accordance with information about phase and intensity that is added to the received optical signal, the received optical signal into an electrical signal representing transmitting information.

After the beam divider circuit 154, a variable optical phase shifter 202 is provided for one of the lights obtained by dividing light into the X-polarization transmitter 156 and the Y-polarization transmitter 158 while a fixed optical phase shifter 204 is provided for the other. The variable optical phase shifter 202 and the fixed optical phase shifter 204 are coupled to a light wave synthesizer circuit 206 for synthesizing the divided lights together again. In the present embodiment, the variable optical phase shifter 202 is provided for the X-polarization transmitter 156 while the fixed phase shifter 204 is provided for the Y-polarization transmitter 158. Output terminals of the light wave synthesizer circuit 206 are coupled to the X-polarization transmitter 156 and the Y-polarization transmitter 158.

The light wave synthesizer circuit 206 is a two-input two-output synthesizer circuit having two input terminals and two output terminals such as a directional coupler or a multimode interferometer.

The light wave synthesizer circuit 206 causes two lights to interfere with each other. In accordance with the relationship of intensity and phase between the two lights, the intensity and phase of output light is determined. It is thus necessary to control two input phases, and hence, phase shifters (the variable optical phase shifter 202 and the fixed optical phase shifter 204) are provided in a preceding stage (two input terminal side).

The phase shifters (the variable optical phase shifter 202 and the fixed optical phase shifter 204) change the refractive index of optical waveguide and accordingly changes the phase of propagating light. The phase shifter usually uses heat from a heater provided close to the waveguide or change in carrier density at a P-N junction to change the refractive index of waveguide and accordingly change the phase of light. The variable optical phase shifter 202 and the fixed optical phase shifter 204 adjust the phase difference between lights inputted to the light wave synthesizer circuit 206; one simple method is to provide a phase shifter for one of the two input terminals to shift the phase of one of the two lights inputted to the light wave synthesizer circuit 206 as in FIG. 2, but other methods can be employed. For example, another applicable method is to provide two variable optical phase shifters 202 for both the two input terminals of the light wave synthesizer circuit 206 to add a phase difference to input lights in accordance with the difference between the two variable optical phase shifters 202. Alternatively, a configuration may be provided for the beam divider circuit 154 to adjust the phase difference within the beam divider circuit 154. The following description will use the simplest configuration in FIG. 2.

It is desirable that the two input optical paths to the light wave synthesizer circuit 206 be identical in length to each other from the light source 152 to the light wave synthesizer circuit 154. In this case, the fixed phase shifter 204 is required to provide a fixed phase difference. For example, as in FIG. 2, the variable optical phase shifter 202 is provided for the X-polarization transmitter 156 while the fixed optical phase shifter 204 is provided for the Y-polarization transmitter 158. Furthermore, when the division ratio of the X-polarization transmitter 156 to the Y-polarization transmitter 158 is a:b in the variable optical divider circuit (the beam divider circuit 154) for the purpose of providing compensation for the transmission PDL and when the ratio of intensity of the light inputted to the X-polarization transmitter 156 to the light inputted to the Y-polarization transmitter 158 is a':b', the degree of phase shift provided by the fixed optical phase shifter 204 is determined to satisfy the following expression: a':b'=a:b. Specifically, a phase shift degree ϕ provided by the fixed phase shifter 204 is given by the following expression 1.

Math. 1

$$\phi = \cos^{-1}\left(-\frac{(a+b)*(a-b)}{2*a*b}\right)$$ Expression (1)

In an actual circuit, the variable optical phase shifter 202 may serve as the fixed phase shifter 204 to add a fixed phase; or a required phase difference may be given by slightly varying optical paths for the two lights inputted to the light wave synthesizer circuit 206.

Figure 3:
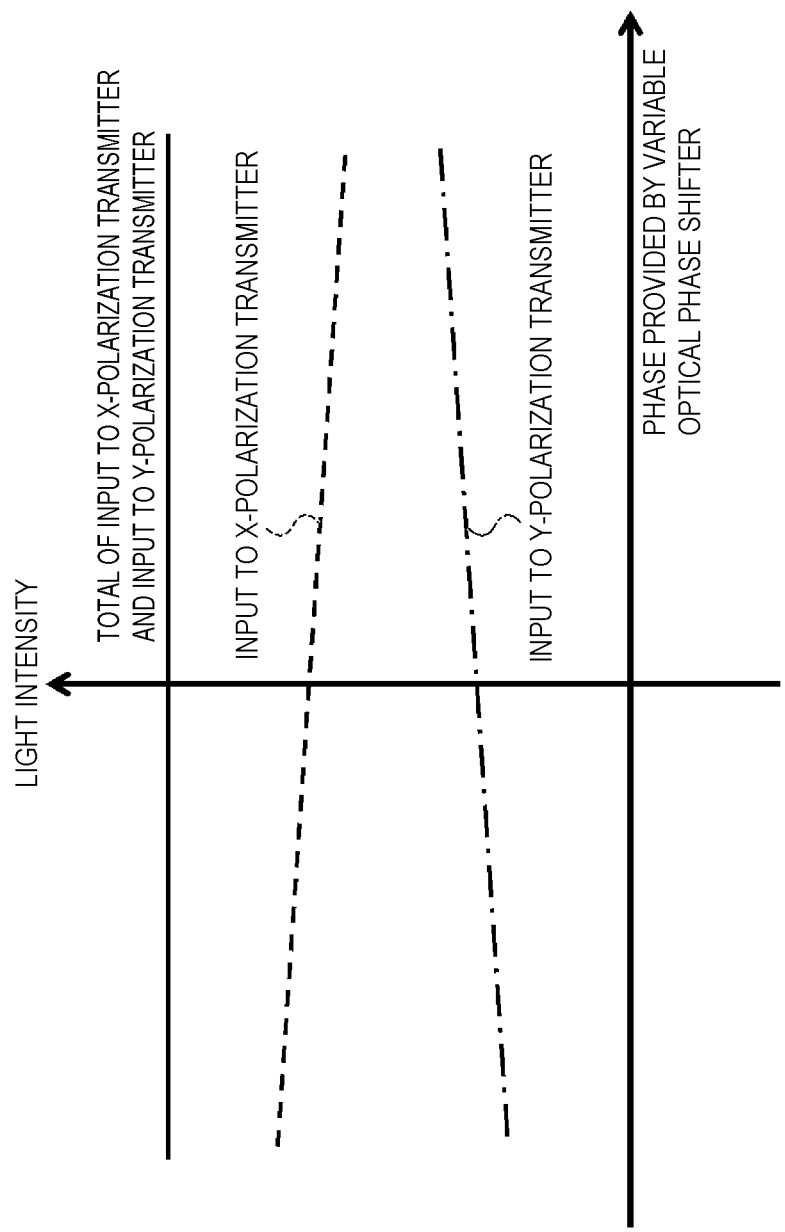
FIG. 3 illustrates a relationship between the degree of phase shift provided by a variable optical phase shifter and the light intensity.
Figure 4:
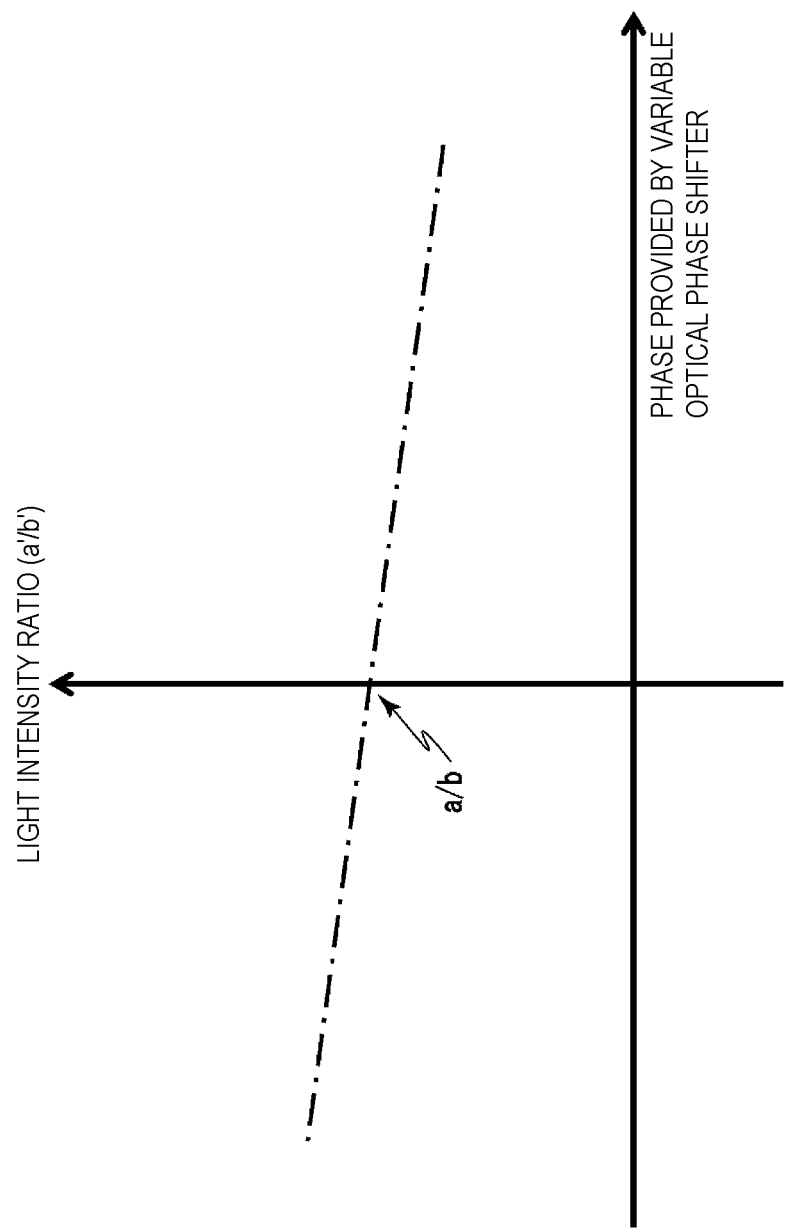
FIG. 4 illustrates the ratio of intensity of light inputted to an X-polarization transmitter to light inputted to a Y-polarization transmitter.

With this configuration, by providing a slight phase difference with the use of the variable optical phase shifter 202, it is possible to slightly change the intensity of light inputted to the X-polarization transmitter 156 and the intensity of light inputted to the Y-polarization transmitter 158 from a:b. Further, when the division ratio is adjusted, no excess loss occurs. As indicated individually by the dashed line and the dot-dash line in FIG. 3, the degree of phase shift given by the variable optical phase shifter changes the intensity of light inputted to the X-polarization transmitter and the intensity of light inputted to the Y-polarization transmitter. In this case, however, the total of intensity of these lights is constant and no excess loss occurs. As illustrated in FIG. 4, when the phase given by the variable phase shifter 202 is 0 (the phase difference is 0), the light intensity ratio a'/b' remains as a/b; when the phase given by the variable phase shifter 202 increases (decreases) (when the phase difference increases (decreases)), a'/b' falls below (rises above) a/b; as such, the ratio a':b' can be changed as illustrated in FIG. 4.

At the time of actual adjustment, it is necessary to monitor the light output intensity. This is unnecessary when the variable optical phase shifter 202 gives a predetermined phase difference, but otherwise the phase shifter needs to be adjusted while the light intensity is monitored. Usually, a monitor light receive element (not illustrated in the drawing) is integrated in the configuration of the transmitter; the monitor light receive element makes the adjustment for phase shifting while monitoring a modulator (not illustrated in the drawing). Such a monitor light receive element is provided in the X-polarization transmitter 156 and/or the Y-polarization transmitter 158 or provided in a subsequent stage after the X-polarization transmitter 156 and/or the Y-polarization transmitter 158. As described above, by using the monitor light receive element for polarized waves provided in the configuration of the transmitter, the variable optical phase shifter 202 is adjusted while the light intensity is monitored, so that compensation is provided for the transmission PDL.

In the configuration of the present embodiment, the ratio a:b is set as 1:1 in design, and by operating the variable optical phase shifter 202, the ratio a':b' can be accordingly adjusted to provide compensation for the transmission PDL of the X-polarization transmitter 156 and the Y-polarization transmitter 158. This configuration, however, increases the operation of the variable optical phase shifter, resulting in increased power consumption. The modulator of the polarization multiplex optical transmitter has an average transmission PDL because losses are always unequal due to its configuration. Thus, the ratio a:b can be adjusted in accordance with the average transmission PDL, and as a result, it is possible to reduce the average operation of the phase shifter and consequently reduce power consumption.

When the transmission PDL occurs due to manufacturing variations, by using the variable optical phase shifter to adjust the ratio a':b', which indicate the intensity of light inputted to the X-polarization transmitter 156 and the intensity of light inputted to the Y-polarization transmitter 158, in such a manner as to provide compensation for the transmission PDL, it is possible to balance the power of output polarized waves without increasing the excess loss. If the circuit has been manufactured exactly as designed, it is unnecessary to operate the variable optical phase shifter 202. While the above description has explained change in the transmission PDL due to manufacturing variations, the transmission PDL can change due to not only manufacturing variations but also the wave-length dependency or the temperature dependency of the transmitter circuit with regard to loss. When optical transceivers are in actual operation, the transmission PDL greatly changes as the environmental temperature or the operational wave length changes. Against such changes of the transmission PDL, the phase shifter can be operated to provide compensation for these changes, so that the power of polarized waves of output transmission light can be balanced.

Figure 5:
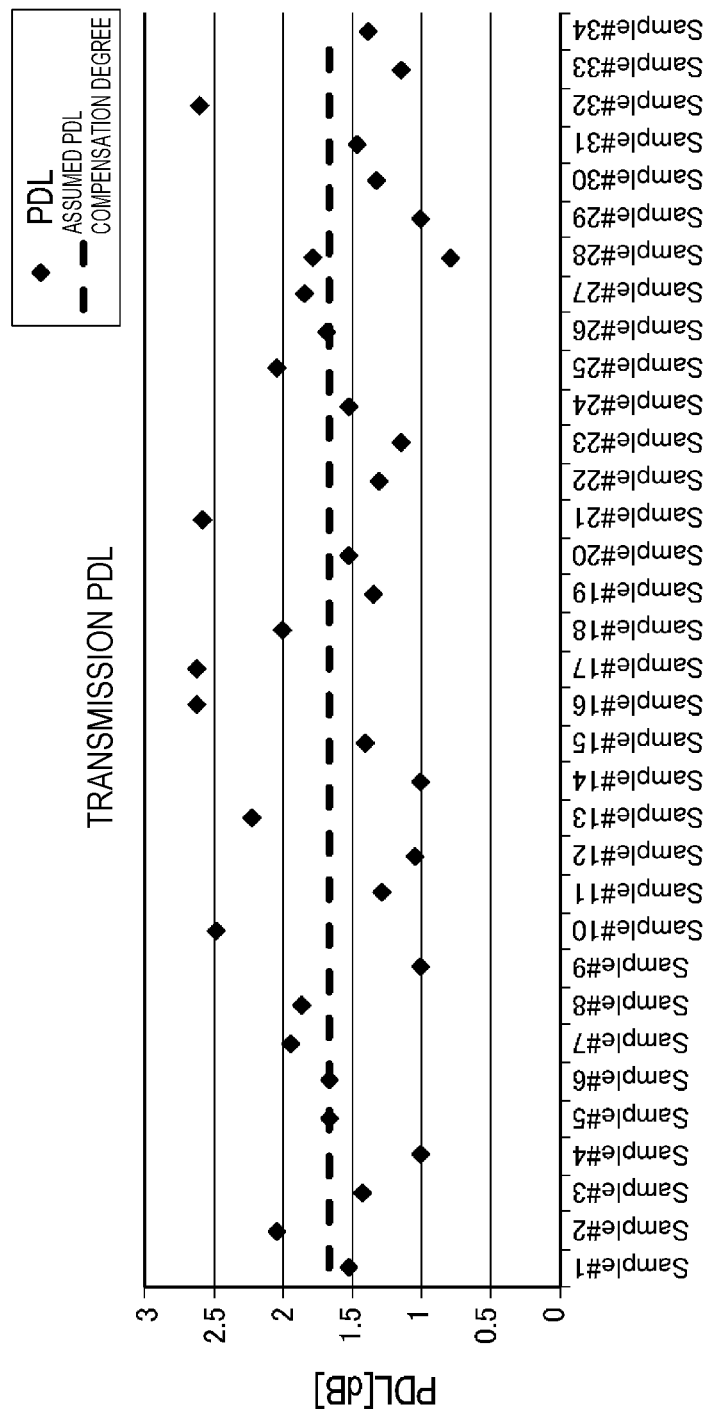
FIG. 5 illustrates variations of transmission polarization dependent loss (PDL).
Figure 6:
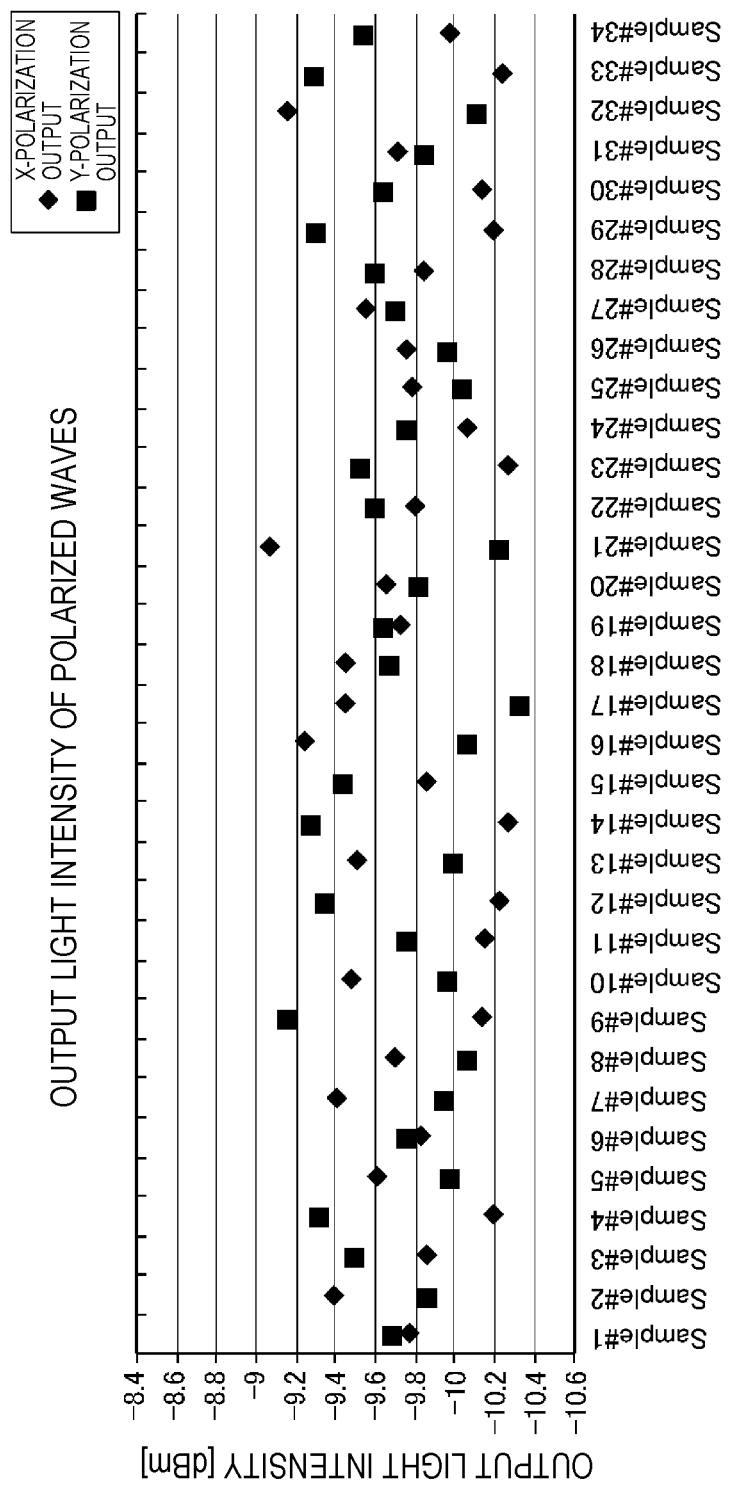
FIG. 6 illustrates output light power of polarized waves.

FIG. 5 illustrates variations of the transmission PDL caused by actual manufacturing variations. The transmission PDL varies among samples due to manufacturing variations between X-polarization and Y-polarization transmitters, variations in the division ratio, or manufacturing variations of the polarization rotator or the like. In the case of the known configuration as in FIG. 1, the configuration is designed to adjust the ratio a:b so as to provide compensation for the transmission PDL by using the beam divider circuit; however, it is impossible to provide compensation for individual variations of the transmission PDL. Hence, in practice the configuration is designed in which the ratio a:b is set to provide compensation for an average transmission PDL as illustrated in FIG. 5, but the degree of compensation actually leaves a deficiency of approximately 1 dB to the average loss. As a result, the actual output light power of each polarized wave differs (varies) among samples as illustrated in FIG. 6. The intensity of output light of X-polarized wave and the intensity of output light of Y-polarized wave differ from each other in accordance with variations of the transmission PDL. The difference in power between polarized waves occurs in accordance with a corresponding transmission PDL. Since such remaining difference in power between polarized waves affects the transmission quality, it is necessary to eliminate the difference.

Figure 7:
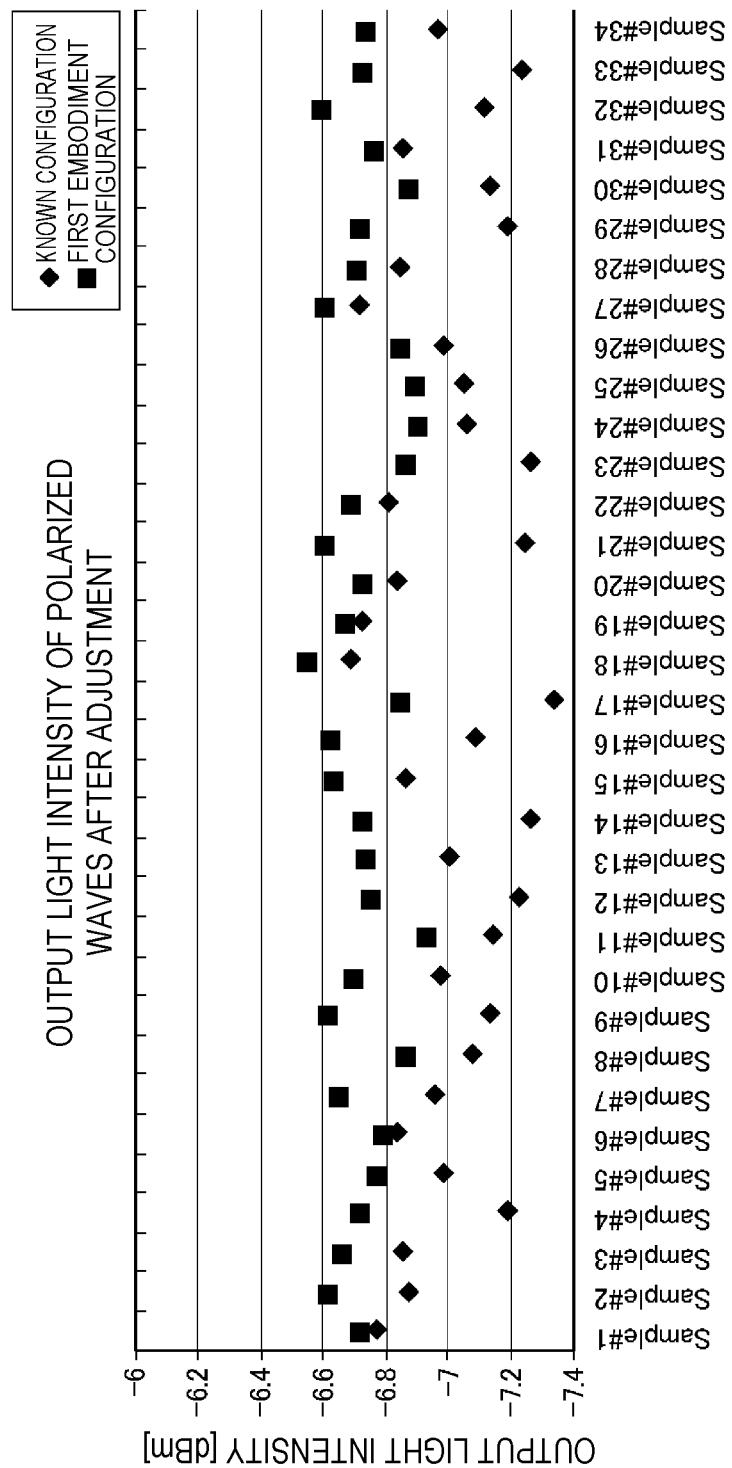
FIG. 7 illustrates output light power of polarized waves after adjustment.

In FIG. 7, with respect to the intensity of synthesized output light when the output light power is adjusted to be balanced between the polarized waves, the case in which the adjustment is performed with the known technology and the case with the configuration of the present embodiment are compared to each other. In the case of the known configuration in FIG. 1, the optical attenuator attenuates the light of one polarized wave of a higher light intensity. By contrast, in the case of the configuration of the present embodiment, the variable optical phase shifter 202 adjusts the output power of each polarized wave. In this case, the optical attenuators 160 and 162 in FIG. 2 refrain from light attenuation and light always passes through the optical attenuators 160 and 162. In the case of the present embodiment, the optical attenuators 160 and 162 are unnecessary for the adjustment of output power of each polarized wave and thus not necessarily provided. The optical attenuator may be integrated in the circuit when the optical attenuator is required to function as a shutter to, for example, completely eliminate output light.

Due to the difference between these configurations, the output light intensity (intensity of synthesized polarized waves) varies as illustrated in FIG. 7. The vertical axis in FIG. 7 indicates the total of the intensity of output light of X-polarized wave and the intensity of output light of Y-polarized wave. As compared to the known configuration, it is obvious that the configuration of the present embodiment achieves higher output light intensities. When the transmission PDL changes due to manufacturing variations, since the configuration does not include any optical attenuator, the transmission light intensity can be maintained to be relatively high. Conversely, the known configuration attenuates the intensity of output light of one polarized wave of a higher intensity to match the intensity of output light of the other polarized wave of a lower intensity. As a result, in principle the total intensity of output light is less than that of the present embodiment.

As described above, with the configuration of the present embodiment, the intensity of output light of X-polarized wave and the intensity of output light of Y-polarized wave can be balanced in accordance with the transmission PDL without causing any loss in principal. As a result, when manufacturing variations of the transmission PDL, the wave-length dependency, and the temperature dependency exist, the decrease in transmission light intensity can be minimized.

Second Embodiment

Since there is a demand for downsizing transceivers, one chip implementation including a transmitter and a receiver has been researched and developed. The mainstream of the one chip implementation is a planar circuit fabricated by employing a manufacturing process of electronic integrated circuits such as a complementary metal-oxide semiconductor (CMOS) with the use of Si or InP as a specific material. Among the circuit configurations of a beam divider circuit implemented as such a planar circuit, the configuration in which a plurality of divider circuits are coupled in multiple stages can achieve division with the least excess loss.

As described above, the division ratio required for the beam divider circuit varies in accordance with required transceiver performances or applications. This embodiment describes a specific method of designing a beam divider circuit that achieves a ratio 75:25 as the total light intensity ratio of the intensity of light transmitted to the transmit side to the intensity of light transmitted to the receive side and also achieves a particular division ratio enabling compensation for a 3 dB output PDL that occurs on average between the X-polarization circuit and the Y-polarization circuit; and this embodiment also describes a specific method of designing a configuration that enables compensation for the transmission PDL.

FIG. 8 illustrates an example of a circuit configuration of the present embodiment. The beam divider circuit 154 divides light from the light source 152 into four paths. Paths P6, P7, P5, and P3 in FIG. 8 are connected respectively to the X-polarization receiver 106, the Y-polarization receiver 108, the X-polarization transmitter 156, and the Y-polarization transmitter 158. Although various configurations can be applied to the beam divider circuit 154, this configuration is suitable when light is divided unequally in the ratio 75:25 into the transmit side and the receive side. In the beam divider circuit 154, a splitter 801 of the first stage divides light inputted from the light source 152 through a path P1 into two lights. One of the two lights is transmitted to the Y-polarization transmitter 158 through the path P3 via the light wave synthesizer circuit 206. The other of the two lights is transmitted to a splitter 802 of the second stage through a path P2. The splitter 802 further divides the light into two lights. One of the two lights is transmitted to the X-polarization transmitter 156 through the path P5 via the light wave synthesizer circuit. The other of the two lights is transmitted to the receive side (the X-polarization receiver 106 and the Y-polarization receiver 108) through a path P4 via a splitter 803. Usually, light is equally inputted to the X-polarization receiver 106 and the Y-polarization receiver 108 with the same light intensity, and thus, the splitter 803 is an equal divider circuit. The other light from the splitter 802 is transmitted to the splitter 803 of the third stage through the path P4. The splitter 803 divides the light into two lights. One of the two lights is transmitted to the X-polarization receiver 106 through the path P6. The other of the two lights divided by the splitter 803 is transmitted to the Y-polarization receiver 108 through the path P7.

The ratio of the transmit side light intensity (total light intensity of the paths P5 and P3) to the receive side light intensity (total light intensity of the paths P6 and P7) is set as 75:25. Additionally, when it is assumed that the transmission PDL caused on average is 3 dB and light is divided into the path P5 and the path P3 in the light intensity ratio 1:2, the splitters divide light into the paths P5, P3, P6, and P7 in the following light intensity ratio: P5:P3:P6:P7=25:50:12.5:12.5.

To achieve this division ratio, the splitters 801, 802, and 803 are implemented by coupling splitters for dividing input light in the ratio 1:1 in multiple stages in the manner as illustrated in FIG. 8.

While a specific splitter division ratio and a specific connection method are presented here with regard to an example of the division ratio required in the beam divider circuit 154, the same circuit configuration can achieve other division ratios.

More generally, to achieve the following division ratio: path P5:path P3:path P6:path P7=w:x:y:z, where w+x+y+z=1, the splitter 801 of the first stage is designed to use the division ratio x:w+y+z, the splitter 802 of the second stage is designed to use the division ratio w:y+z, and the splitter 803 of the third stage is designed to use the division ratio y:z. The average transmission PDL for which compensation is provided is $10 \times \log 10((w+y+z) \times w/(y+z)/x)$. The total light division ratio of the transmit side to the receive side is $(w+x):(y+z)$. These relationships determine three kinds of required characteristics of the division ratio for the X-polarization receiver 106 and the Y-polarization receiver 108, the transmission PDL for which compensation is provided, and the total light division ratio for the transmit side and the receive side; accordingly, variables w, x, y, and z are uniquely determined; and consequently three splitter division ratios are determined.

The beam divider circuit of the present embodiment can in principle achieve any division ratio, but this beam divider circuit is suitable when the division ratio of the light intensity on the transmit side to the light intensity on the receive side is 75:25 and compensation is provided for the transmission PDL by several dB. This is because the division ratios required for the splitters of respective stages are all close to 1:1. Among splitters implemented in planar circuits, it is easy to implement a splitter of an almost equal division ratio close to 1:1, but it is difficult to implement a splitter of a largely unequal division ratio. This is because, for example, the loss usually increases as the inequality required for the splitter increases.

The paths P5 and P3 of the beam divider circuit 154 are connected to the light wave synthesizer circuit 206. The light wave synthesizer circuit 206 can be implemented by using a directional coupler or a multimode interferometer. As described above, it is desirable that the two input optical paths (the path passing the splitter 802 and the path not passing the splitter 802) to the light wave synthesizer circuit 206 be identical in length to each other from the light source 152 to the light wave synthesizer circuit 154. In this case, the fixed phase shifter 204 is required to provide a fixed phase difference.

The fixed phase shifter 204 that can shift the phase by a degree given by Expression (1) is provided in the path P3 and the variable optical phase shifter 202 is provided in the path P5.

To adjust the transmission PDL, by operating the variable optical phase shifter 202 at a small degree, it is possible to change the intensity of light transmitted to the X-polarization transmitter 156 and the Y-polarization transmitter 158. With this configuration, when the transmission PDL changes due to variations of circuits, the wave-length dependency of operation, or the temperature dependency, it is possible to operate the phase shifters (the variable optical phase shifter 202 and the fixed optical phase shifter 204) to provide compensation for a corresponding changed value. Consequently, it is possible to constantly balance the intensity of output light of X-polarized wave and the intensity of output light of Y-polarization.

Third Embodiment

As another embodiment, FIG. 9 illustrates a specific method of connecting splitters. Also in the configuration of the present embodiment, the beam divider circuit 154 divides the light source 152 into four paths. The paths P6, P7, P4, and P5 in FIG. 9 are connected respectively to the X-polarization receiver 106, the Y-polarization receiver 108, the X-polarization transmitter 156, and the Y-polarization transmitter 158. A splitter 901 of the first stage divides light inputted from the light source 152 through the path P1 into two lights. One of the two lights is transmitted to a splitter 902 of the second stage through the path P3. The other of the two lights is transmitted to a splitter 903 of the second stage through the path P2. The splitter 902 further divides the light into two lights. One of the two lights is transmitted to the X-polarization transmitter 156 through the path P4 via the light wave synthesizer circuit. The other of the two lights is transmitted to the Y-polarization transmitter 158 through the path P5 via the light wave synthesizer circuit. The splitter 903 further divides the light into two lights. One of the two lights is transmitted to the X-polarization receiver 106 through the path P6. The other of the two lights is transmitted to the Y-polarization receiver 108 through the path P7.

As described above, it is desirable that the two input optical paths to the light wave synthesizer circuit 206 be identical in length to each other from the light source 152 to the light wave synthesizer circuit 154. In this case, the fixed phase shifter 204 is required to provide a fixed phase difference. The fixed phase shifter 204 that can shift the phase by a degree given by Expression (1) is provided in the path P5 and the variable optical phase shifter 202 is provided in the path P4.

Also in the configuration of the beam divider circuit 154 as illustrated in FIG. 9, the output side of the path P4 and the output side of the path P5 are connected to the light wave synthesizer circuit 206 and the phase shifters (the variable optical phase shifter 202 and the fixed optical phase shifter 204) are provided in the paths P4 and P5, and as a result, it is possible to provide compensation for the transmission PDL.

The beam divider circuit 154 of the present embodiment can in principle achieve any division ratio, but this beam divider circuit is suitable when the division ratio of the light intensity on the transmit side to the light intensity on the receive side is 50:50 and compensation is provided for the transmission PDL by several dB. This is because the division ratios required for the splitters of respective stages are all close to 1:1. As described above, among splitters implemented in planar circuits, it is easy to implement a splitter of a division ratio close to 1:1, and such a splitter can achieve low loss.

REFERENCE SIGNS LIST

102 Polarization splitter
104 Polarization rotator
106 X-polarization receiver
108 Y-polarization receiver
152 Light source
154 Beam divider circuit
156 X-polarization transmitter
158 Y-polarization transmitter
160, 162 Optical attenuator
164 Polarization rotator
166 Polarization multiplexer
202 Variable optical phase shifter
204 Fixed optical phase shifter
206 Optical synthesizer circuit
801, 802, 803, 901, 902, 903 Splitter

The invention claimed is:

1. A polarization multiplex optical transmitter circuit comprising:
    a beam divider circuit configured to divide light outputted from a light source:
    a variable optical phase shifter provided in at least one of two waveguides connected to output terminals of the beam divider circuit;
    a light wave synthesizer circuit connected to the two waveguides;
    first and second optical transmitters coupled to two output terminals of the light wave synthesizer circuit;
    a polarization multiplexer configured to synthesize two output polarized waves from the first and second optical transmitters; and
    a polarization rotator provided between the first and second optical transmitters and the polarization multiplexer and coupled to at least one of the first and second optical transmitters, wherein the beam divider circuit includes:
    a first splitter coupled to the light source and having two output terminals, one of the two output terminals being coupled to the light wave synthesizer circuit;
    a second splitter coupled to another of the two output terminals of the first splitter and having two output terminals, one of the two output terminals being coupled to the light wave synthesizer circuit; and
    a third splitter coupled to another of the two output terminals of the second splitter and having two output terminals coupled to first and second receivers; and an optical path from the light source to the light wave synthesizer circuit via the second splitter is identical in length to an optical path from the light source to the light wave synthesizer circuit not via the second splitter.

2. The polarization multiplex optical transmitter circuit according to claim 1, wherein
in a case in which it is assumed that a ratio of intensity of light inputted to the first optical transmitter to light inputted to the second optical transmitter is a: b such that polarized waves, which are to be synthesized and multiplexed by the polarization multiplexer, of the first and second optical transmitters are identical in light intensity to each other,
a fixed phase shifter is provided for one of two input terminals of the light wave synthesizer circuit, the fixed phase shifter being configured to constantly provide a phase ϕ given by Expression (1) presented below, and
when the variable optical phase shifter provides a 0 phase shift, adjustment is performed such that the ratio of intensity of the light inputted to the first optical transmitter to the light inputted to the second optical transmitter is a: b.

Math. 1

$$\phi = \cos^{-1}\left(-\frac{(a+b)*(a-b)}{2*a*b}\right) \quad \text{Expression (1)}$$

3. A polarization multiplex optical transceiver circuit comprising:
the polarization multiplex optical transmitter circuit according to claim 2; and
a polarization multiplex optical receiver circuit including first and second optical coherent mixers coupled to the beam divider circuit.

4. A polarization multiplex optical transceiver circuit comprising:
the polarization multiplex optical transmitter circuit according to claim 2; and
a polarization multiplex optical receiver circuit including first and second optical coherent mixers coupled to the beam divider circuit.

5. A polarization multiplex optical transmitter circuit comprising:
a beam divider circuit configured to divide light outputted from a light source;
a variable optical phase shifter provided in at least one of two waveguides connected to output terminals of the beam divider circuit;
a light wave synthesizer circuit connected to the two waveguides;
first and second optical transmitters coupled to two output terminals of the light wave synthesizer circuit;
a polarization multiplexer configured to synthesize two output polarized waves from the first and second optical transmitters; and
a polarization rotator provided between the first and second optical transmitters and the polarization multiplexer and couples to at least one of the first and second optical transmitters, wherein the beam divider circuit includes:
a first splitter coupled to the light source;
a second splitter coupled to one of two output terminals of the first splitter and having two output terminals coupled to the light wave synthesizer circuit; and
a third splitter coupled to another of the two output terminals of the first splitter and having two output terminals coupled to first and second receivers; and
two optical paths from the light source to the light wave synthesizer circuit are identical in length to each other.

6. The polarization multiplex optical transmitter circuit according to claim 3, wherein
in a case in which it is assumed that a ratio of intensity of light inputted to the first optical transmitter to light inputted to the second optical transmitter is a: b such that polarized waves, which are to be synthesized and multiplexed by the polarization multiplexer, of the first and second optical transmitters are identical in light intensity to each other,
a fixed phase shifter is provided for one of two input terminals of the light wave synthesizer circuit, the fixed phase shifter being configured to constantly provide a phase ϕ given by Expression (1) presented below, and
when the variable optical phase shifter provides a 0 phase shift, adjustment is performed such that the ratio of intensity of the light inputted to the first optical transmitter to the light inputted to the second optical transmitter is a: b.

Math. 1

$$\phi = \cos^{-1}\left(-\frac{(a+b)*(a-b)}{2*a*b}\right) \quad \text{Expression (1)}$$

7. A polarization multiplex optical transceiver circuit comprising:
the polarization multiplex optical transmitter circuit according to claim 3; and
a polarization multiplex optical receiver circuit including first and second optical coherent mixers coupled to the beam divider circuit.

* * * * *